United States Patent
Jauquet et al.

(10) Patent No.: US 9,665,091 B2
(45) Date of Patent: May 30, 2017

(54) SYSTEMS AND METHODS INTEGRATING MULTIPLE PIECES OF INDUSTRIAL EQUIPMENT

(71) Applicant: Rockwell Automation Technologies, Inc., Mayfield Heights, OH (US)

(72) Inventors: John J. Jauquet, Milwaukee, WI (US); Jimi R. Michalscheck, Racine, WI (US); Kelly A. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); Matthew R. Ericsson, Lyndhurst, OH (US); Andrew Wilber, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 69 days.

(21) Appl. No.: 14/871,002

(22) Filed: Sep. 30, 2015

(65) Prior Publication Data
US 2016/0285274 A1 Sep. 29, 2016

Related U.S. Application Data

(60) Provisional application No. 62/139,182, filed on Mar. 27, 2015.

(51) Int. Cl.
*H02J 4/00* (2006.01)
*F16K 31/00* (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .. H02J 4/00; F16K 35/00; F16K 31/00; F16K 37/0025; G05B 19/406; G05B 19/41875; G05B 19/042; G05B 19/4183; G05B 19/4185; G05B 2219/21147; G05B 2219/31229; G05B 2219/32368; G05B 2219/39251; G05B 2219/50193; G07C 9/00111; G07C 9/00309; G07C 9/00896;
(Continued)

(56) References Cited

U.S. PATENT DOCUMENTS 8,831,770 B2 * 9/2014 Heffron ................... G07F 9/026
                                                           700/214
9,135,768 B2 * 9/2015 Heffron ................... G07F 9/026

* cited by examiner

*Primary Examiner* — Robert J Hoffberg
(74) *Attorney, Agent, or Firm* — Fletcher Yoder, P.C.

(57) ABSTRACT

In one embodiment, a manifold apparatus may include a number of housings. The housings may receive an electrical or a fluid conduit. The manifold apparatus may also include an actuation mechanism of each of the number of housings configured to control a supply of electricity or fluid from the respective electrical or fluid conduit to one or more industrial automation equipment, and a locking mechanism including a number of armatures. Each of the number of armatures is associated with a respective housing of the plurality of housings, and each of the number of armatures is configured to physically prevent a respective actuation mechanism of the respective housing from changing states.

21 Claims, 13 Drawing Sheets

(51) Int. Cl.
*F16K 37/00* (2006.01)
*F16K 35/00* (2006.01)
*G05B 19/418* (2006.01)
*G05B 19/042* (2006.01)
*G05B 19/406* (2006.01)
*G07C 9/00* (2006.01)
*G06F 17/18* (2006.01)
*G07C 3/00* (2006.01)

(52) U.S. Cl.
CPC ........ *F16K 37/0025* (2013.01); *G05B 19/042* (2013.01); *G05B 19/406* (2013.01); *G05B 19/4183* (2013.01); *G05B 19/41875* (2013.01); *G06F 17/18* (2013.01); *G07C 3/00* (2013.01); *G07C 9/00111* (2013.01); *G07C 9/00309* (2013.01); *G07C 9/00896* (2013.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/11* (2015.11); *Y02P 80/12* (2015.11); *Y02P 90/02* (2015.11); *Y02P 90/10* (2015.11)

(58) Field of Classification Search
CPC . G07C 3/00; G06F 17/18; Y02P 90/02; Y02P 90/10; Y02P 80/11; Y02P 80/12
See application file for complete search history.

SYSTEMS AND METHODS INTEGRATING MULTIPLE PIECES OF INDUSTRIAL EQUIPMENT

CROSS-REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure generally relates to an industrial automation system. More particularly, the present disclosure relates to systems and methods for integrating multiple pieces of industrial equipment using a manifold apparatus.

BRIEF DESCRIPTION

In one embodiment, a manifold apparatus may include a number of housings. The housings may receive an electrical or a fluid conduit. The manifold apparatus may also include an actuation mechanism of each of the number of housings configured to control a supply of electricity or fluid from the respective electrical or fluid conduit to one or more industrial automation equipment, and a locking mechanism including a number of armatures. Each of the number of armatures is associated with a respective housing of the plurality of housings, and each of the number of armatures is configured to physically prevent a respective actuation mechanism of the respective housing from changing states.

In one embodiment, an industrial automation system may include one or more industrial automation equipment and a manifold apparatus. The manifold apparatus may include a plurality of housings. Each housing is configured to receive an electrical line or a fluid source. Each of the number of housings include an electrical switch to connect and disconnect the electrical line to one or more industrial automation equipment, a valve to connect and disconnect the fluid source to the one or more industrial automation equipment, or some combination thereof. The manifold apparatus also includes a locking mechanism to attach to the manifold apparatus. The locking mechanism includes a plurality of armatures that are each configured to physically prevent a respective electrical switch or a respective valve of a respective one of the number of housings from changing states. Each of the number of armatures is associated with a respective housing of the number of housings. The manifold apparatus also includes a processor to control an operation of the electrical switch and the valve.

In one embodiment, a method includes receiving, by a processor, one or more signals to connect or disconnect a number of electrical lines via a respective number of electrical switches included in a number of housings of a manifold apparatus, to connect or disconnect a number of liquid or gas sources via a respective number of valves included in the number of housings. The manifold apparatus may operate in an industrial environment and the number of electrical lines and the number of liquid or gas sources are coupled to a machine in the industrial environment. The method also includes controlling, via the processor, a locking mechanism attached to the manifold apparatus. The locking mechanism includes a number of armatures to physically prevent a respective electrical switch or a respective valve of a respective housing from changing states Each of the number of armatures is associated with a respective housing of the number of housings based on the one or more signals.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
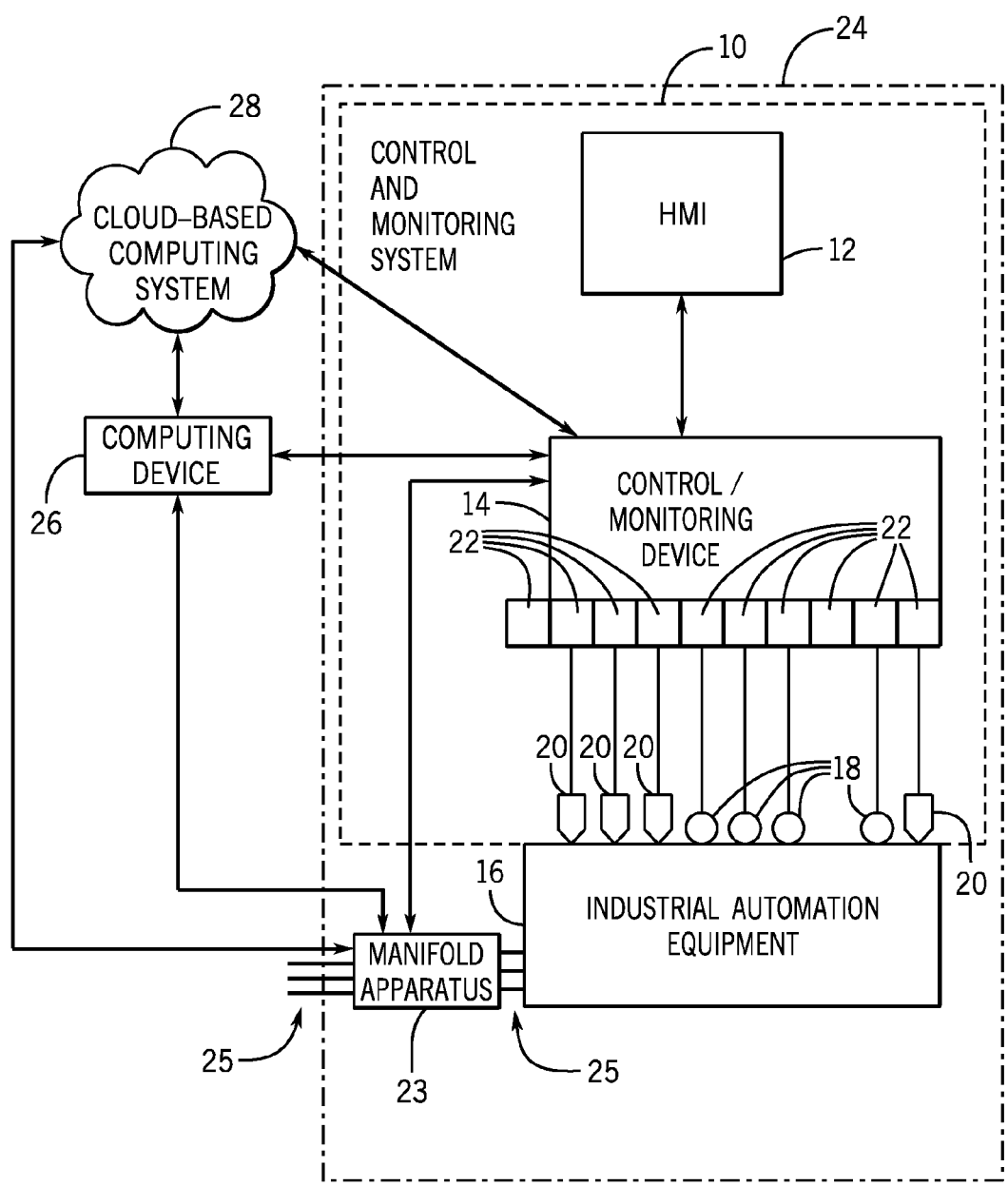
FIG. 1 is a diagrammatical representation of an exemplary control and monitoring system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, the present disclosure discusses numerous concepts regarding how devices in an industrial automation system may exchange information with each other and use this shared information to assist users in the industrial automation environment to manage the operations and maintenance of the devices. In one embodiment, the industrial automation system may include a communication architecture that is structured according to a tri-partite paradigm that facilitates communications between a device, a computing device, and a cloud-based computing system. The information shared between each component within this tri-partite structure may enable various devices within the industrial automation system to operate more efficiently, users to perform tasks related to the conditions or operations of the industrial automation system more efficiently, and generally provide for improved operations of the industrial automation system. In some embodiments, the efficiency of the technicians performing certain procedures and/or of the industrial automation system may be further increased by one or more of the components of the tri-partite structure interacting with a manifold apparatus, as described in detail below.

Certain operations performed by technicians, machinery, and/or processes in a facility (e.g., factory, plant) may involve performing certain procedures to ensure that the operations are executed properly. For instance, when preparing to service an industrial automation device (e.g., drive), a technician may follow a lockout-tagout procedure associated with placing the particular industrial automation device offline before performing the service operations.

Lockout-tagout procedures are used throughout various industries and research settings to ensure that machinery and/or processes are placed offline properly and not started prior to the completion of maintenance or servicing. Generally, a lockout-tagout procedure may include physically locking a part of the machinery in one position (e.g., off) to prevent the part from shifting to an alternate position (e.g., on). The procedure may then involve tagging or placing a label on the device to indicate that the machinery is locked out or is being serviced. Typically, the tag may include information such as a statement (e.g., "do not operate—equipment locked out") and the information of the person who affixed the tag to the device.

Facilities that include equipment that are placed offline using lockout-tagout procedures may include a number of different types of power sources, material sources, and the like. For example, one facility may include a number of electrical or fluid conduits (e.g., power feeder lines, pressure lines, chemical lines). In these facilities, each feeder line (e.g., electrical or fluid conduit) may enter the facility at various locations within the facility. As such, the devices used to control each respective feeder line may be located at various positions within the facility.

Accordingly, embodiments of the present disclosure relate to providing a manifold apparatus that centralizes a location where a number of different types of electrical or fluid conduits (e.g., feeder lines) are received. Thus, the manifold apparatus may be referred to as a "centralized manifold apparatus" herein. However, the term "centralized" should not be construed as limiting the manifold apparatus' location to the center of a facility. Indeed, the manifold apparatus may be located at any suitable location within the facility. Instead, "centralized" may refer to the manifold apparatus providing a single central location where feeder lines are received in the facility. The manifold apparatus may include a controller that may control the opening and closing of each feeder line. As such, the manifold apparatus may include a single locking mechanism that controls multiple sources related to different types of equipment (e.g., air, electric, fuel). Additionally, the manifold apparatus may communicate with the computing device, the cloud-based computing system, and/or the devices to coordinate different degrees of facility lockout or shutdown procedures.

For example, software running on the computing device may be used to assist technicians in placing equipment offline using the lockout-tagout procedure. The software may cause the computing device to send signals to the manifold apparatus to operate an actuation mechanism (e.g., electrical switches and/or valves) and to lock out the actuation mechanism (e.g., switches and/or valves) in a desired way based on the lockout-tagout procedures. To illustrate, the software may cause the computing device to send signals to the manifold apparatus to prevent power from entering a facility but allow pressure to still be available to certain devices at a particular step in the lockout-tagout procedure. To that end, the single locking mechanism of the manifold apparatus may be enabled to lock all of the types of lines at once or only a portion of the lines as desired.

Further, the computing device may use signals sent from the manifold apparatus to control the operation of the software application used to assist the technician with regard to the maintenance and operation of equipment in the industrial automation system and/or to control the operation of equipment of the industrial automation system. For example, using the signals from the manifold apparatus, the software application may cause certain steps of the lockout-tagout procedure to be enabled (e.g., advance to a next sequence of steps) when the signals indicate a confirmation of a status from another device within the facility. As may be appreciated, the coordinated efforts between the software and the manifold apparatus may help ensure that machines being placed offline are placed offline properly.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP®, ControlNet®, DeviceNet®, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP®, and so forth), ControlNet®, DeviceNet® or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

Further, as illustrated in the embodiment, a manifold apparatus 23 may be used to receive a number of different types of feeder lines 25 that connect to one or more pieces of the industrial automation equipment 16. As depicted, the manifold apparatus 23 provides a single centralized location in the facility through which the feeder lines 25 traverse to connect to the pieces of the industrial automation equipment 16. The feeder lines 25 may provide a number of different types of power sources (e.g., electricity), liquid or gas sources (e.g., fuel, air, nitrogen), and the like to enable operation of the pieces of the industrial automation equipment 16.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28. Further, the manifold apparatus 23 may be communicatively coupled to the computing device 26, the control/monitoring device 14, and/or the cloud-based computing system 28. In some embodiments, the computing device 26 may send signals to the manifold apparatus 23 to control the opening and/or closing of the feeder lines 25 as desired for particular steps of the lockout-tagout procedures being performed by the software running on the computing device 26.

Figure 2:
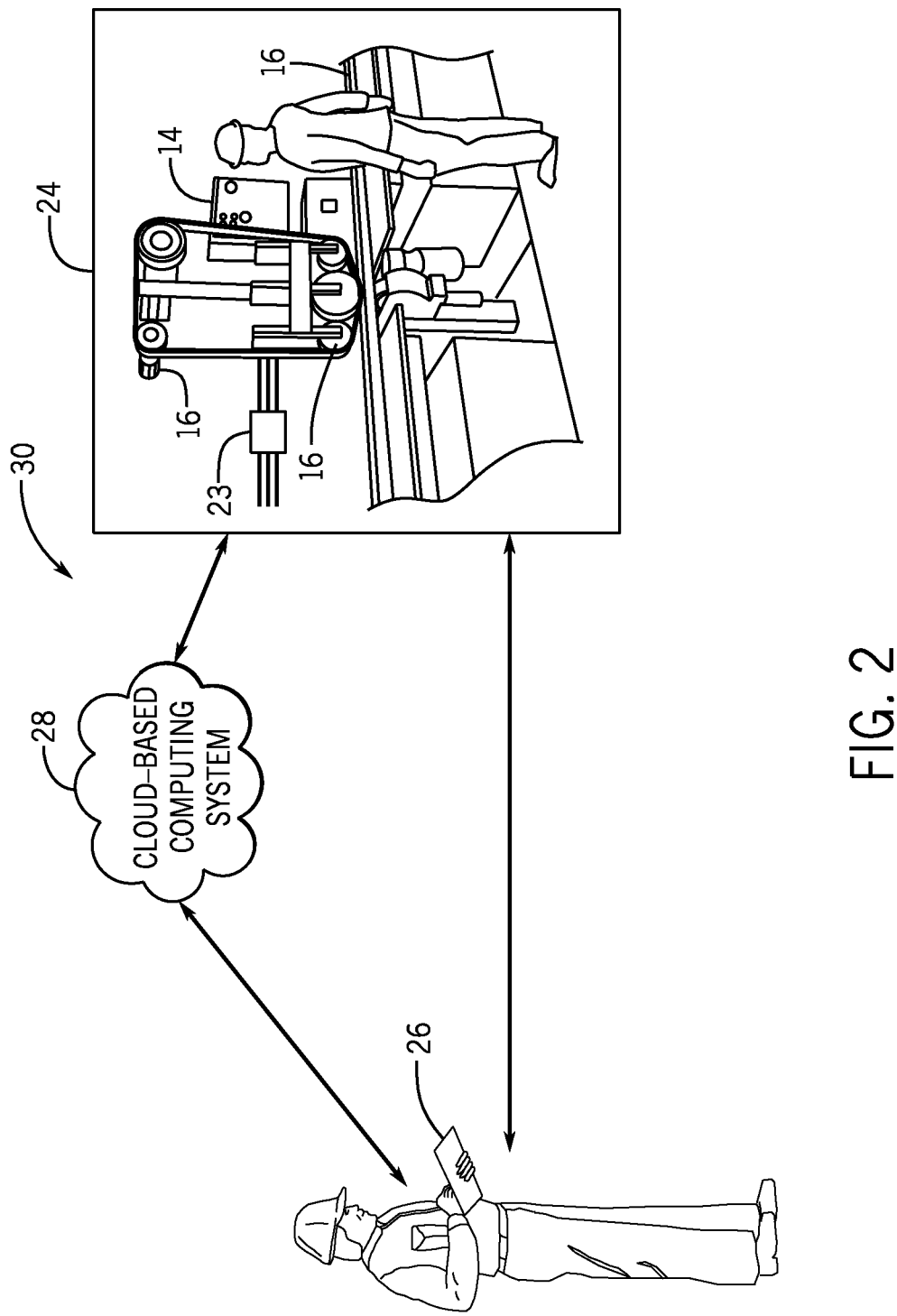
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16 and/or the manifold apparatus 23. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16 and/or the manifold apparatus 23, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16, the manifold apparatus 23, and/or the computing device 26. As such, the cloud-based computing system 28 may be capable of wired or wireless communication between the industrial automation equipment 16, the manifold apparatus 23, and/or the computing device 26. In one embodiment, the cloud-based computing system 28 may be accessible via the Internet or some other network.

After establishing a communication connection between the computing device 26, the industrial automation equipment 16 (e.g., via an associated control/monitoring device 14 or computing device of the industrial automation equipment 16), and/or the manifold apparatus 23, the cloud-based computing system 28 may receive data acquired by the computing device 26, the industrial automation equipment 16, and/or the manifold apparatus 23. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, the manifold apparatus 23, and the like. Additional details regarding the cloud-based computing system 28 will be discussed below with reference to FIG. 4.

Figure 3:
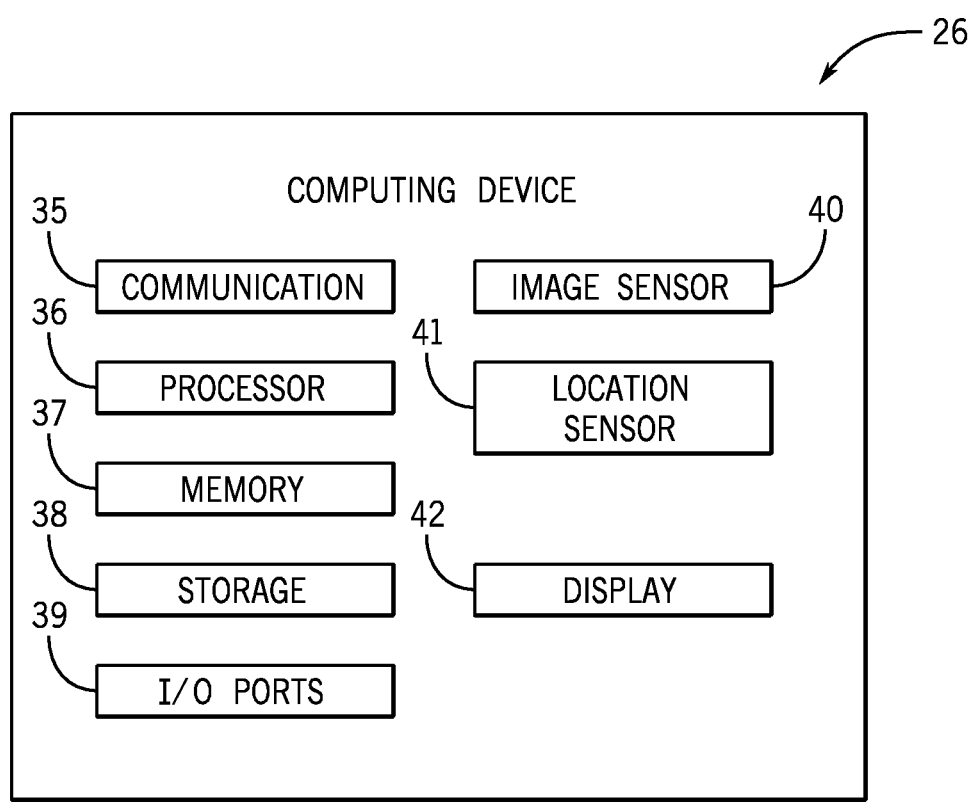
FIG. 3 is a block diagram of example components within a computing device that is part of the communication network of FIG. 2, in accordance with embodiments presented herein.

FIG. 3 is a block diagram of example components within the computing device 26 that is part of the communication network 30, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a input/display 42, additional sensors (e.g., vibration sensors, temperature sensors) and the like. The communication component 35 may be a wireless or wired communication component that may facilitate communication between the industrial automation equipment 16, the cloud-based computing system 28, the manifold apparatus 23, and other communication capable devices.

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors 18 disposed on the industrial automation equipment 16, and the like. For example, the software application may provide instructions and guide a technician to place equipment offline with the lockout-tagout procedure by communicating with the manifold apparatus 23.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16 and/or the manifold apparatus 23. As such, the computing device 26 may communicatively couple to industrial automation equipment 16 and/or the manifold apparatus 23 via a direct connection between the devices or via the cloud-based computing system 28.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs from a user of the computing device 26. As such, the display 42 may serve as a user interface to communicate with the industrial automation equipment 16 and/or the manifold apparatus 23. The display 42 may be used to display a graphical user interface (GUI) for operating the industrial automation equipment 16 and/or the manifold apparatus 23, for tracking the maintenance of the industrial automation equipment 16 and/or the manifold apparatus 23, performing various procedures (e.g., lockout tagout, placing device offline, replacing component, servicing device) for the industrial automation equipment 16 and/or the manifold apparatus 23, and the like. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial automation equipment 16 or for a number of pieces of industrial automation equipment in the industrial application 24, to control the general operations of the industrial application 24. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
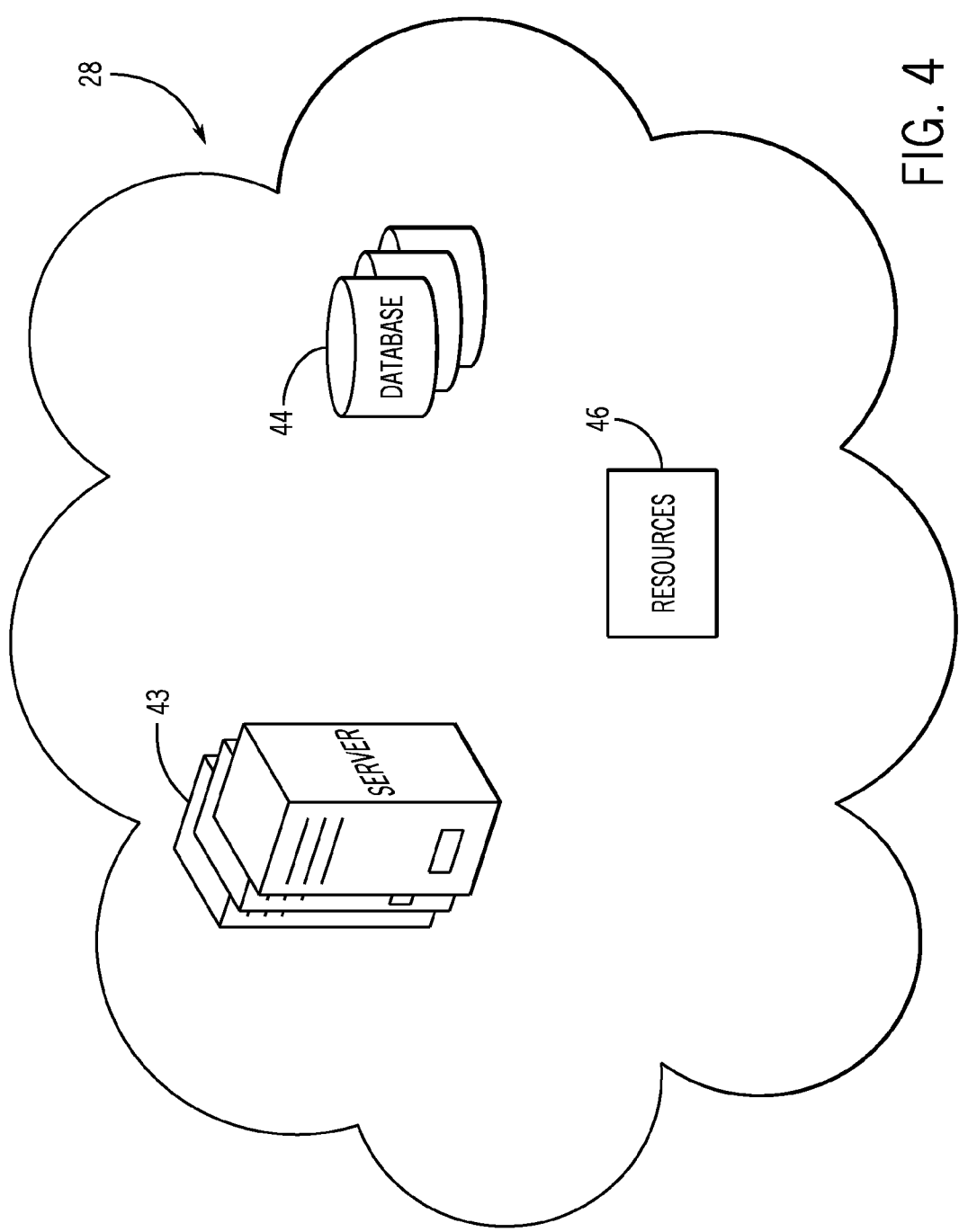
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, the manifold apparatus 23, operators of the computing device 26 or the industrial automation equipment 16, or the like. For example, the databases 44 may include information regarding procedures for operating and/or maintaining the industrial automation equipment 16 and/or the manifold apparatus 23. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16 and/or the manifold apparatus 23. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
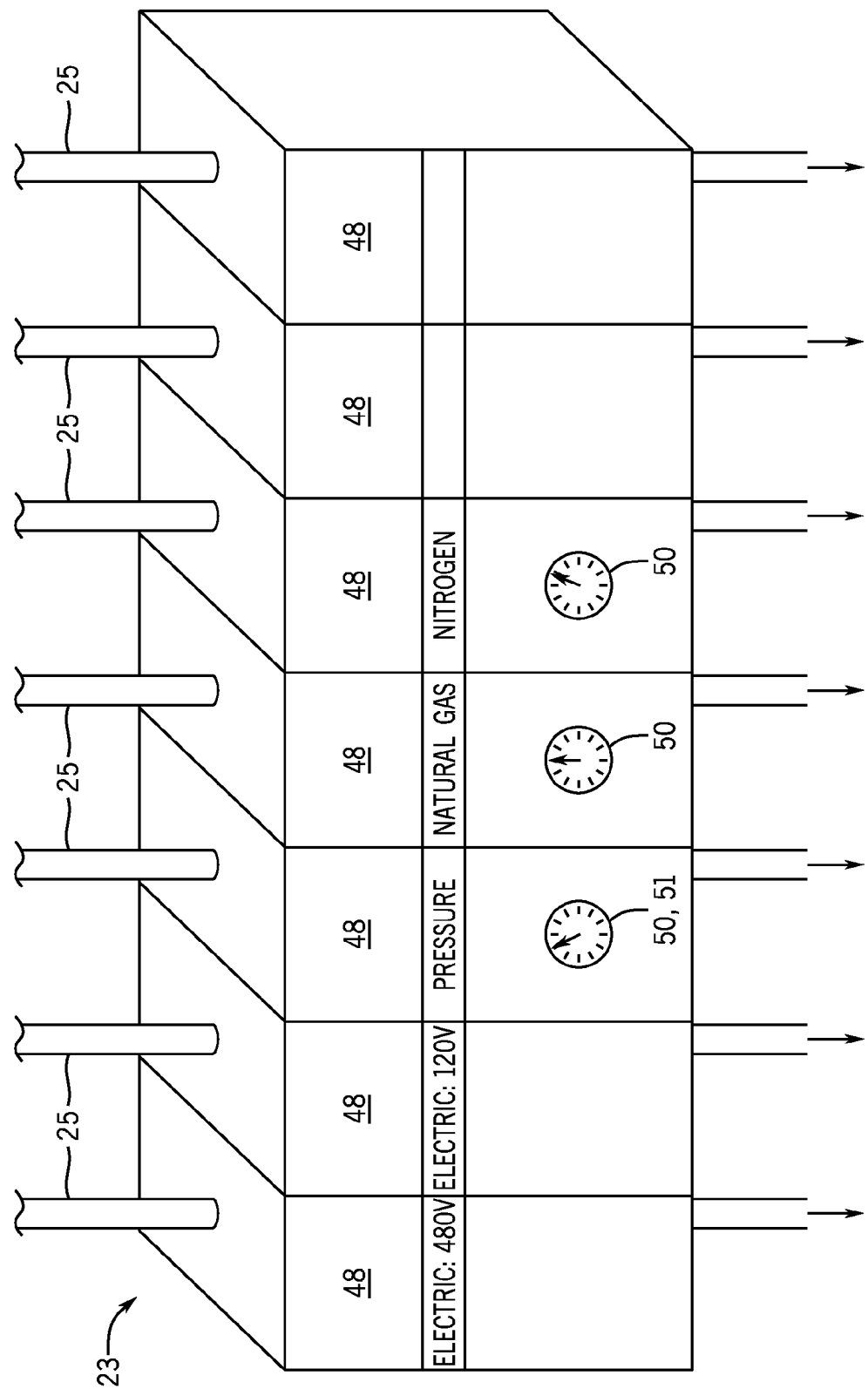
FIG. 5 is a schematic diagram of a manifold apparatus, in accordance with embodiments presented herein.

FIG. 5 is a schematic diagram of the manifold apparatus 23, in accordance with embodiments presented herein. As depicted, numerous feeder lines 25 may pass through the manifold apparatus 23. The feeder lines 25 may provide power, chemicals, pressure, and so forth to various industrial automation equipment 16. Each feeder line 25 or a number of feeder lines 25 may pass through a respective housing 48 of the manifold apparatus 23. It should be noted, that the feeder lines 25 may pass through a single housing 48 in some embodiments. The housings 48 may include a switch, valve, contactor, and the like that are used to control the supply of the particular source. In some embodiments, a single locking mechanism may be included in the manifold apparatus 23 to uniformly and/or independently control the multiple sources related to different types of equipment (e.g., air, electricity, fuel). As depicted, a feeder line 25 may provide a first voltage (e.g., 480 volts (V)) to power large equipment and another feeder line 25 may provide a second voltage (e.g., 120 V) to power smaller equipment (e.g., controller). Additionally, another feeder line 25 may provide air pressure, another feeder line 25 may provide natural gas, and another feeder line 25 may provide nitrogen. The manifold apparatus 23 is shown to include additional housings 48 for other types of feeder lines 25. It should be noted that any number of feeder lines 25 may pass through the manifold apparatus 23 (and corresponding housings 48) as desired.

The housings 48 may include one or more gauges 50 that display a measurement of a resource (e.g., electricity, material) being provided to the equipment 16. The gauges 48, which may be presented as graphics on a display feature, may be disposed on the exterior of the manifold apparatus 23. For example, pressure gauge 50, 51 displays the amount of air pressure provided by a respective feeder line 25. The manifold apparatus 23 may be communicatively coupled to the computing device 26, the control/monitoring device 14, the industrial automation equipment 16, the cloud-based computing system 28, and/or other devices. As such, measurement data from the gauges 50 and statuses (e.g., open, closed) regarding the feeder lines 25 may be communicated to the computing device 26, the industrial automation equipment 16, the cloud-based computing system 28, and the like. In some embodiments, the manifold apparatus 23 may be controlled to assist a technician in performing procedures, such as placing equipment offline using lockout-tagout protocol. Indeed, the manifold apparatus 23 may enable different degrees of facility lockout or shutdown procedures. For example, the manifold apparatus 23 may provide a single locking mechanism that integrates with valves and/or switches to control the opening and/or closing of all of the feeder lines 25. In some embodiments, once the desired valves and/or switches are closed and/or opened, the single locking mechanism may lock the valves and/or switches in the state (e.g., closed) to prevent the valves and/or switches from changing states (e.g. opening).

Figure 6:
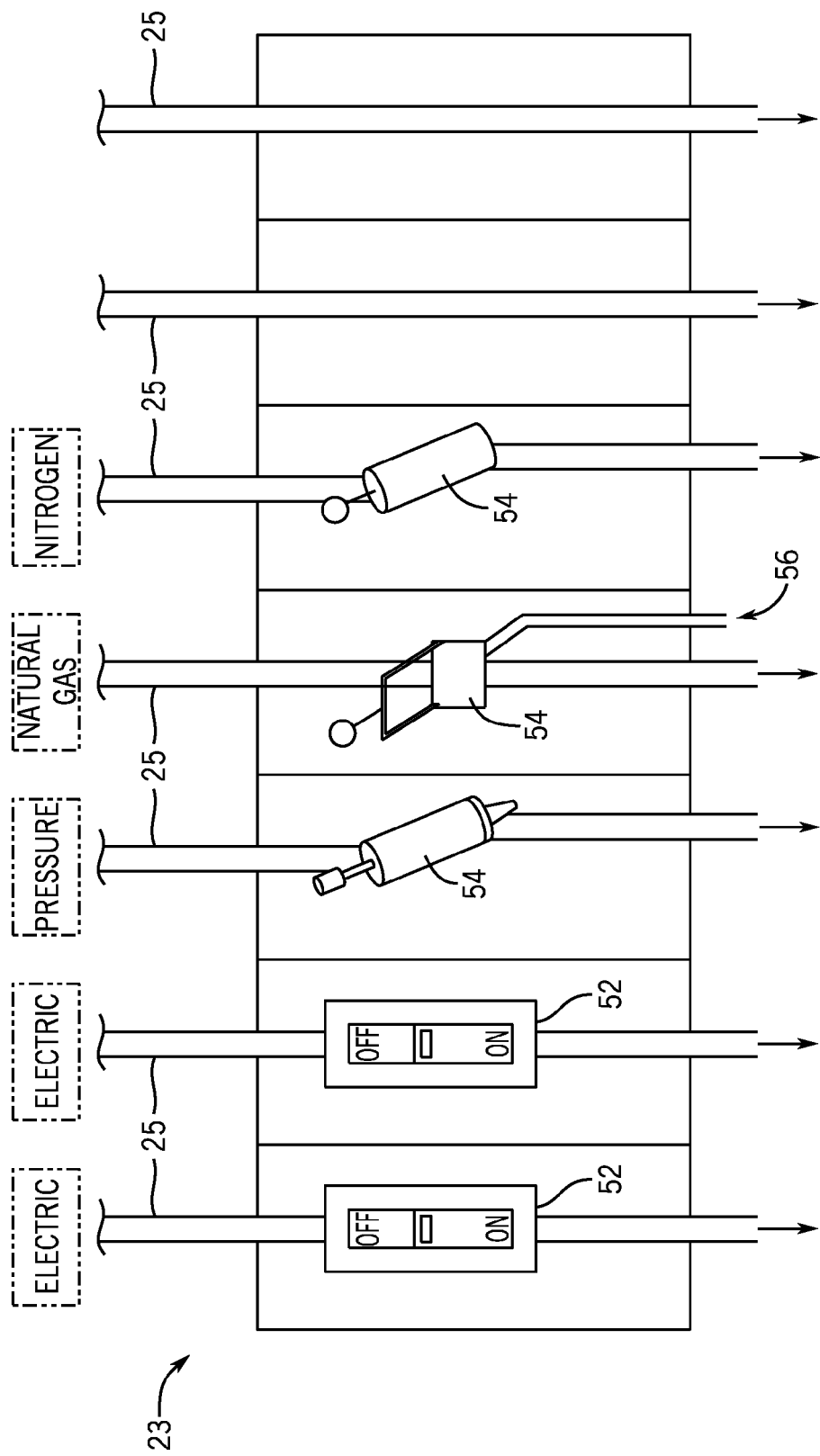
FIG. 6 is an elevational view of the manifold apparatus of FIG. 5, in accordance with embodiments presented herein.

FIG. 6 is an elevation view of the manifold apparatus 23 of FIG. 5, in accordance with embodiments presented herein. As illustrated in the example embodiment, switches 52 may connect and disconnect power (e.g., 480V or 120V) to the equipment 16 connected to the feeder lines 25. In addition, valves 54 are used to supply pressure, natural gas, and/or nitrogen via the respective feeder lines 25. The switches 52 and/or valves 54 may include actuators that receive control signals from a controller or processor of the manifold apparatus 23 that cause the actuators to actuate and close and/or open the switches 52 and/or valves 54. As depicted, the feeder line 25 connected to the natural gas supply may include an exhaust line 56 for venting.

Figure 7:
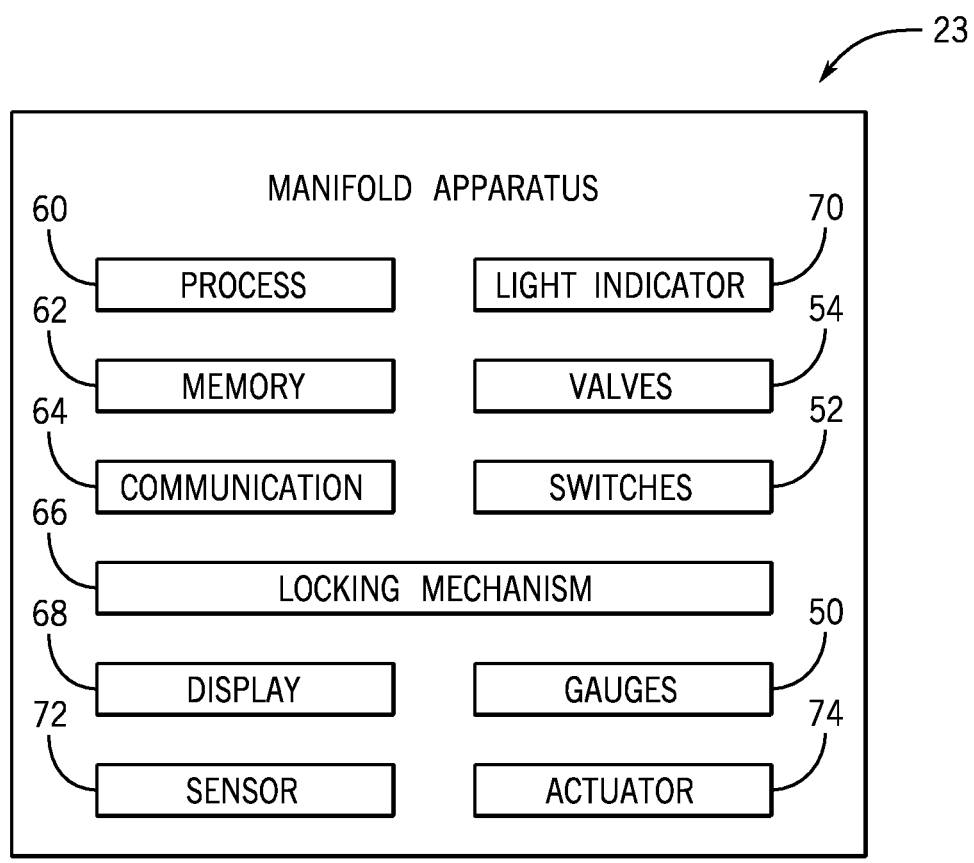
FIG. 7 is a block diagram of example components within the manifold apparatus of FIG. 5, in accordance with embodiments presented herein.

FIG. 7 is a block diagram of example components within the manifold apparatus 23 of FIG. 5, in accordance with embodiments presented herein. For example, the manifold apparatus 23 may include one or more processors 60, one or more memories 62, a communication component 64, a locking mechanism 66, a display 68, one or more light indicator 70, one or more sensors 72, one or more actuators 74, one or more valves 54, one or more switches 52, one or more gauges 50, and the like. In some embodiments, the components may be included in the housing 48. It should be noted that the listed components are provided as example components and the embodiments described herein are not to be limited to the components described with reference to FIG. 7. The communication component 64 may be a wireless or wired communication component that may facilitate communication with the industrial automation equipment 16, the computing device 26, the cloud-based computing system 28, and other communication capable devices. For example, the communication component 64 may enable the processor 60 to coordinate the operation of the manifold apparatus 23 with software executing on the computing device 26 to place a machine in the facility offline.

The processor 60 may be any type of computer processor or microprocessor capable of executing computer-executable code. The processor 60 may also include multiple processors that may perform the operations described below. The memory 62 may be any suitable articles of manufacture that can serve as media to store processor-executable code, data, or the like. These articles of manufacture may represent computer-readable media (e.g., any suitable form of memory or storage) that may store the processor-executable code used by the processor 60 to perform the presently disclosed techniques. Generally, the processor 60 may execute software applications that include programs that control operations of the manifold apparatus 23 via a local or remote communication link. That is, the software applications may communicate with the control/monitoring device 14 and gather information associated with the industrial automation equipment 16 as determined by the control/monitoring device 14, via sensors 18 disposed on the industrial automation equipment 16, and the like. For example, the software application may control the valves 54 and switches 52 to operate when confirmation that one or more factors, such as whether proper personal protection equipment is used, are satisfied.

Further, in certain embodiments, the processor 60 may receive a confirmation of status from other devices within the facility. For example, the processor 60 may receive a signal that confirms that a pressure from a pressure line has successfully bled off. It should be noted that "bled off" or "bleeding off" may refer to decreasing a pressure down to zero. This signal may be received from a device upstream or downstream from the manifold apparatus 23.

The memory 62 may also be used to store the data, analysis of the data, the software applications, and the like. The memory 62 may represent non-transitory computer-readable media (e.g., any suitable form of memory or storage) that is specifically programmed with or stores the processor-executable code used by the processor 60 to perform various techniques described herein. It should be noted that non-transitory merely indicates that the media is tangible and not a signal.

In some embodiments, the locking mechanism 66 may include an electromechanical locking mechanism or actuator 74 that is communicatively coupled to the processor 60. The locking mechanism 66 may also be coupled to and integrate with each of the valves 54 and/or switches 52, as described in detail below. The locking mechanism 66 may be uniformly controlled to open or close the feeder lines 25 via the valves 54 and/or switches 52 at the same time or may be controlled to selectively open and/or close a subset of the feeder lines 25 via the valves 54 and/or switches 52 as desired during a lockout-tagout procedure. Once actuated by the actuators 74, the locking mechanism 66 may adjust the associated valves 54 and/or switches 52 into a changed state (e.g., opened for switches 52 or closed for valves 54).

The light indicator 70 may include any suitable light source, such as light-emitting diodes, lasers, and the like. In some embodiments, the light indicator 70 may indicate a status of at least one of the electrical switches 52 or valves 54. The various statuses may be indicated by any suitable colors. For example, the light indicator 70 may emit a certain color when the electrical switches 52 and/or valves 54 are closed and a different color when the electrical switches 52 and/or valves 54 are open. Additionally or alternatively, an individual light indicator 70 may be visible on or through the respective housing 48 that houses each valve 54 and/or electrical switch 52. In some embodiments, there may be a light indicator 70 for each respective housing 48 that is visible through an opening in an armature of the locking mechanism 66 when locked. For example, the armature may be in the locked position, thereby preventing an electrical switch 52 from closing. In such a scenario, the light indicator 70 may be emitting a certain color of light (e.g., red) that is visible through the opening in the armature.

The sensors 72 may include any image acquisition circuitry such as a digital camera capable of acquiring digital images, digital videos, or the like. In some embodiments, the sensors 72 may provide the image data to the processor 60, which may determine whether the technician is wearing proper personal protection equipment (PPE) and may control the valves 54 and switches 52 based on whether the PPE is being worn. In another embodiment, the sensors 72 may include a location sensor that includes circuitry designed to determine a physical location of the manifold apparatus 23. In one embodiment, the location sensor may include a global positioning system (GPS) sensor that acquires GPS coordinates for the manifold apparatus 23. In another embodiment, the location sensor 72 may include other circuitry such as a radio wave transmitter, an infrared sensor, and the like that may acquire data that may be used to determine a location of the manifold apparatus 23 with respect to other industrial automation equipment 16 or other fixtures in the industrial automation system. The manifold apparatus 23 may transmit any type of acquired data to the computing device 26 and/or the cloud-based computing system 28 for processing. For example, the manifold apparatus 23 may transmit the location data to the computing device 26 to enable the computing device 26 to determine directions to the manifold apparatus 23. In certain embodiments, the manifold apparatus 23 may also include various other sensors that may provide additional data related to an environment in which the manifold apparatus 23 exists. For instance, the other sensors may include an accelerometer, a gas (e.g., smoke, carbon monoxide) sensor, or the like. Additionally, the sensor 72 may include circuitry that may detect a status of the locking mechanism 66. For example, the circuitry may enable detecting objects (e.g., armature of the locking mechanism 66) that are in close proximity to the sensor 72. The sensor 72 may send signals to the processor 60 when objects are within a close proximity and are not within a close proximity, which the processor 60 may use to determine that locking mechanism 66 is locked or unlocked, respectively.

The display 68 may depict visualizations associated with software or executable code being processed by the processor 60. In one embodiment, the display 68 may be a touch display capable of receiving inputs from a user of the manifold apparatus 23. As such, the display 68 may serve as a user interface to communicate with the control/monitoring device 14, the industrial automation equipment 16, cloud-based computing system 28, and/or the computing device 26. The display 68 may be used to display a graphical user interface (GUI) for operating the manifold apparatus 23 by generating input signals from a technician interacting with the display 68, for tracking the maintenance of the manifold apparatus 23, for performing various procedures (e.g., opening and/or closing switches 52 and/or valves 54 according to lockout tagout procedures) for the manifold apparatus 23, and the like. In some embodiments, the gauges 50 may display certain measurements of the pressure, gas, fluid, and the like. For example, the gauges 50 may aid a technician in placing a machine offline by displaying the measurement at a particular step (e.g., display zero pressure that enables the technician to determine that the pressure has blew off after closing a valve 54). In some embodiments, the gauges 50 may use a needle or pointer that moves along a calibrated scale. In some embodiments, the gauges 50 may include an electronic display that displays the measurements. The display 68 may be any suitable type of display, such as a liquid crystal display (LCD), plasma display, or an organic light emitting diode (OLED) display, for example. Additionally, in one embodiment, the display 68 may be provided in conjunction with a touch-sensitive mechanism (e.g., a touch screen) that may function as part of a control interface for the industrial application 24. In some embodiments, the operator interface may be characterized as the HMI 12, a human-interface machine, or the like.

Figure 8:
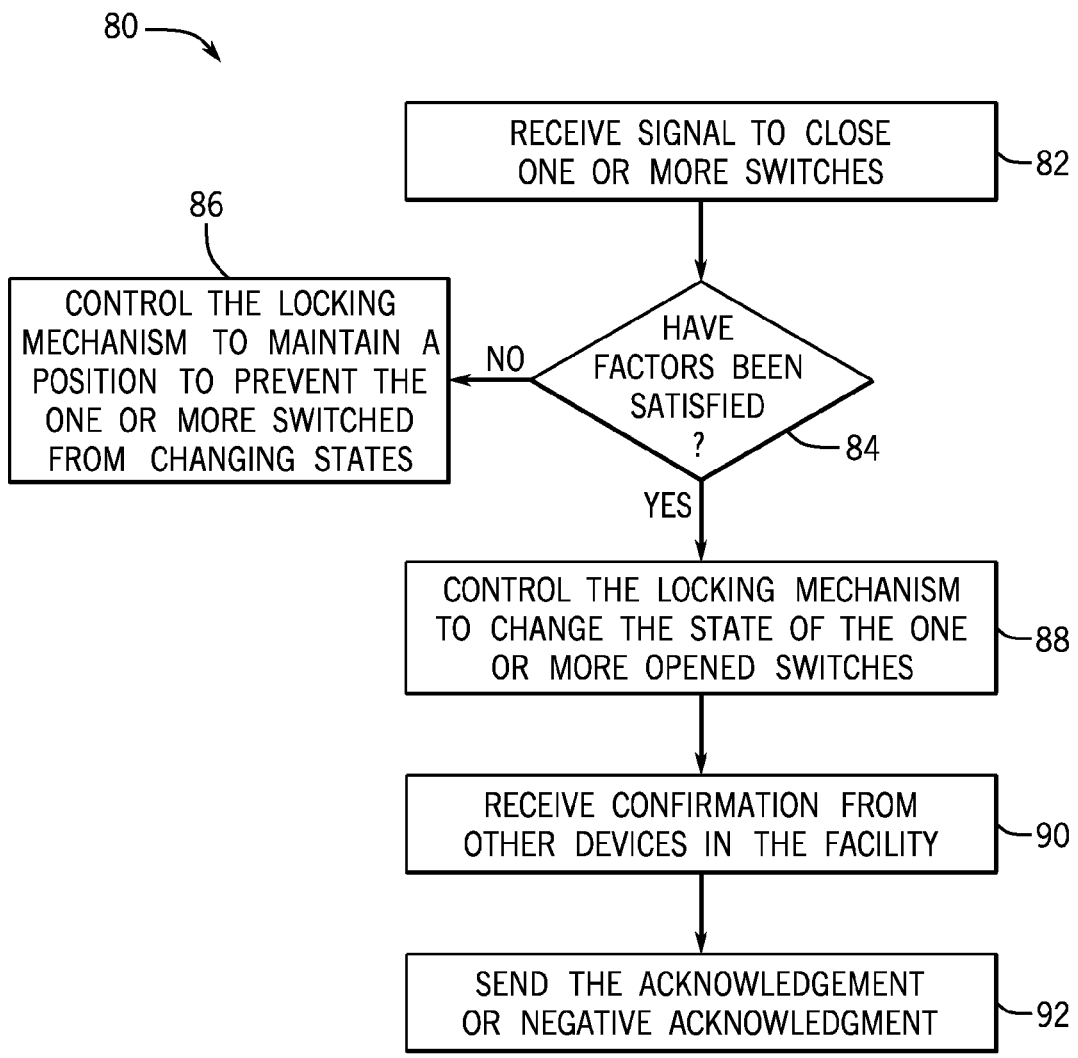
FIG. 8 is a flow diagram of a method for closing the electrical switches of the manifold apparatus of FIG. 5, in accordance with embodiments presented herein.

FIG. 8 is a flow diagram of a method 80 for closing the electrical switches 52 of the manifold apparatus 23 of FIG. 5, in accordance with embodiments presented herein. Although the following description of the method 80 is described with reference to the processor 60 of the manifold apparatus 23, it should be noted that the method 80 may be performed by one or more other processors disposed on other devices that may be capable of communicating with the manifold apparatus 23, such as the computing device 26, the cloud-based computing system 28, the control/monitoring device 14, or other components associated with the industrial application 24. Additionally, although the following method 80 describes a number of operations that may be performed, it should be noted that the method 80 may be performed in a variety of suitable orders and all of the operations may not be performed. It should be appreciated that the method 80 may be wholly executed by the manifold apparatus 23 or the execution may be distributed between the computing device 26 and/or the cloud-based computing system 28.

Referring now to the method 80, the processor 60 may receive (block 82) a signal to close one or more switches 52. The signal may be sent from software running on the computing device 26, the control/monitoring device 14, the cloud-based computing system 28, or the like. In some embodiments, the signal may be sent as input from the technician interacting with the display 68 to reconnect power to industrial automation equipment 16 connected to the feeder lines 25 providing electricity.

The processor 60 may determine (block 84) whether certain factors have been satisfied prior to closing the one or more switches 52. For example, in some embodiments, the processor 60 may not close any switches 52 unless the processor 60 receives signals indicating that proper personal protection equipment (PPE) is worn by the technician near the manifold apparatus 23. The PPE to be worn by the technician may include gloves, goggles, a helmet, boots, jacket, identification badge (e.g., includes name, age, health related information, blood type, allergies), and so forth. The signals may be received by the processor 60 from the sensors 72 or from other devices (e.g., other sensors in the facility, the computing device 26, the control/monitoring device 14, cloud-based computing system 28). Other factors may include whether downstream equipment 16 are offline, whether upstream equipment 16 are offline, whether an authorization code has been received, whether the technician has been authorized, whether a notification that the switches 52 will close has been sent to interested parties and/or other connected equipment 16, and the like. When the factors have not been satisfied, the processor 60 may control (block 86) the locking mechanism 66 by sending control signals to the locking mechanism 66 to maintain a position to prevent the one or more switches 52 from changing states.

In contrast, when the factors are satisfied, the processor 60 may control (block 88) the locking mechanism 66 by sending control signals to the locking mechanism 66 to changes states (e.g., close) of the switches 52. Further, the processor 60 may receive (block 90) a confirmation (e.g., acknowledgment or negative acknowledgment) from other devices in the facility. For example, the control/monitoring device 14 or the industrial automation equipment 16 may send a confirmation to the manifold apparatus 23 when the industrial automation equipment 16 receives electricity after the one or more switches 52 are properly oriented. In some embodiments, the manifold apparatus 23 may send (block 92) the confirmation to the computing device 26, the cloud-based computing system 28, control/monitoring device 14, other industrial automation equipment 16, or the like. The software running on the computing device 26 that assists the technician in placing a machine offline may perform an action, such as move onto the next step in the lockout-tagout procedure, based on the confirmation received.

Figure 9:
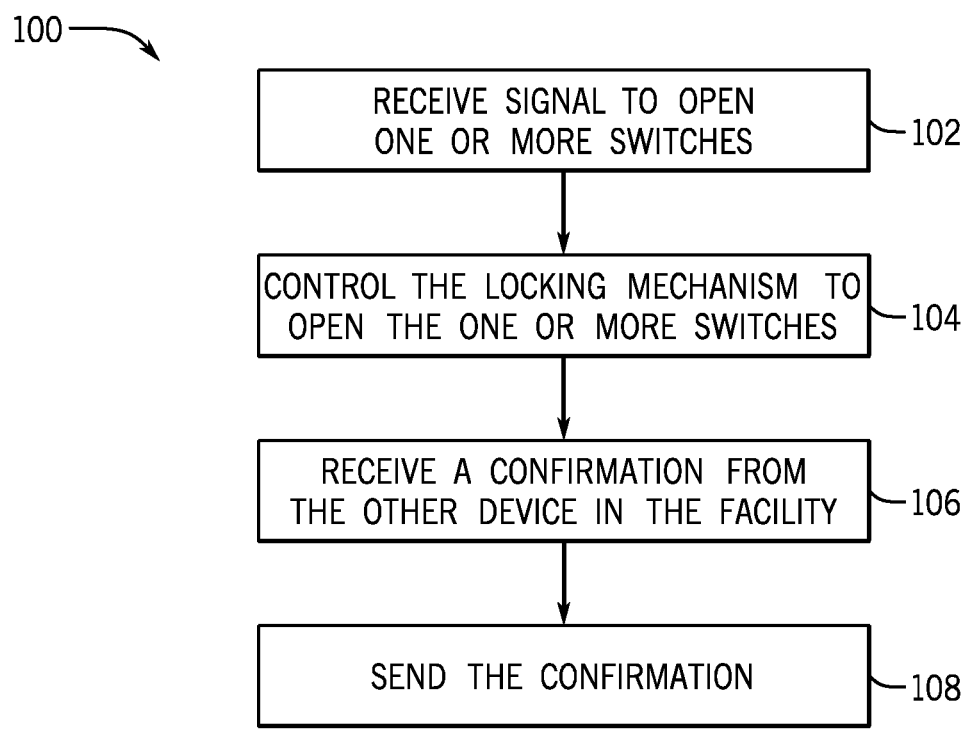
FIG. 9 is a flow diagram of a method for opening the electrical switches of the manifold apparatus of FIG. 5, in accordance with embodiments presented herein.

FIG. 9 is a flow diagram of a method 100 for opening the electrical switches 52 of the manifold apparatus 23 of FIG. 5, in accordance with embodiments presented herein. Although the following description of the method 100 is described with reference to the processor 60 of manifold apparatus 23, it should be noted that the method 100 may be performed by one or more other processors disposed on other devices that may be capable of communicating with the manifold apparatus 23, such as the computing device 26, the cloud-based computing system 28, the control/monitoring device 14, or other components associated with the industrial application 24. Additionally, although the following method 100 describes a number of operations that may be performed, it should be noted that the method 100 may be performed in a variety of suitable orders and all of the operations may not be performed. It should be appreciated that the method 100 may be wholly executed by the manifold apparatus 23 or the execution may be distributed between the computing device 26 and/or the cloud-based computing system 28.

Referring now to the method 100, the processor 60 may receive (block 102) a signal to open one or more switches 52. The signal may be sent from software running on the computing device 26, the control/monitoring device 14, the cloud-based computing system 28, or the like. In some embodiments, the signal may be sent as input from the technician interacting with the display 68 to disconnect power to industrial automation equipment 16 connected to the feeder lines 25 providing electricity.

The processor 60 may control (block 104) the locking mechanism 66 by sending control signals to the locking mechanism 66 to open the one or more opened switches 52. Further, the processor 60 may receive (block 106) a confirmation (e.g., acknowledgment or negative acknowledgment) from other devices in the facility. For example, a current/voltage sensor coupled to the machine that is placed offline may send a confirmation that there is zero current/voltage sensed at the machine, or the manifold apparatus 23 or another device may attempt to communicate with the machine to confirm whether the machine is placed offline after the one or more switches 52 are opened. In some embodiments, the manifold apparatus 23 may send (block 108) the confirmation to the computing device 26, the cloud-based computing system 28, the control/monitoring device 14, other industrial automation equipment 16, or the like. The software running on the computing device 26 that assists the technician in placing a machine offline may perform an action, such as move onto the next step in the lockout-tagout procedure, based on the confirmation sent by the manifold apparatus 23.

Figure 10:
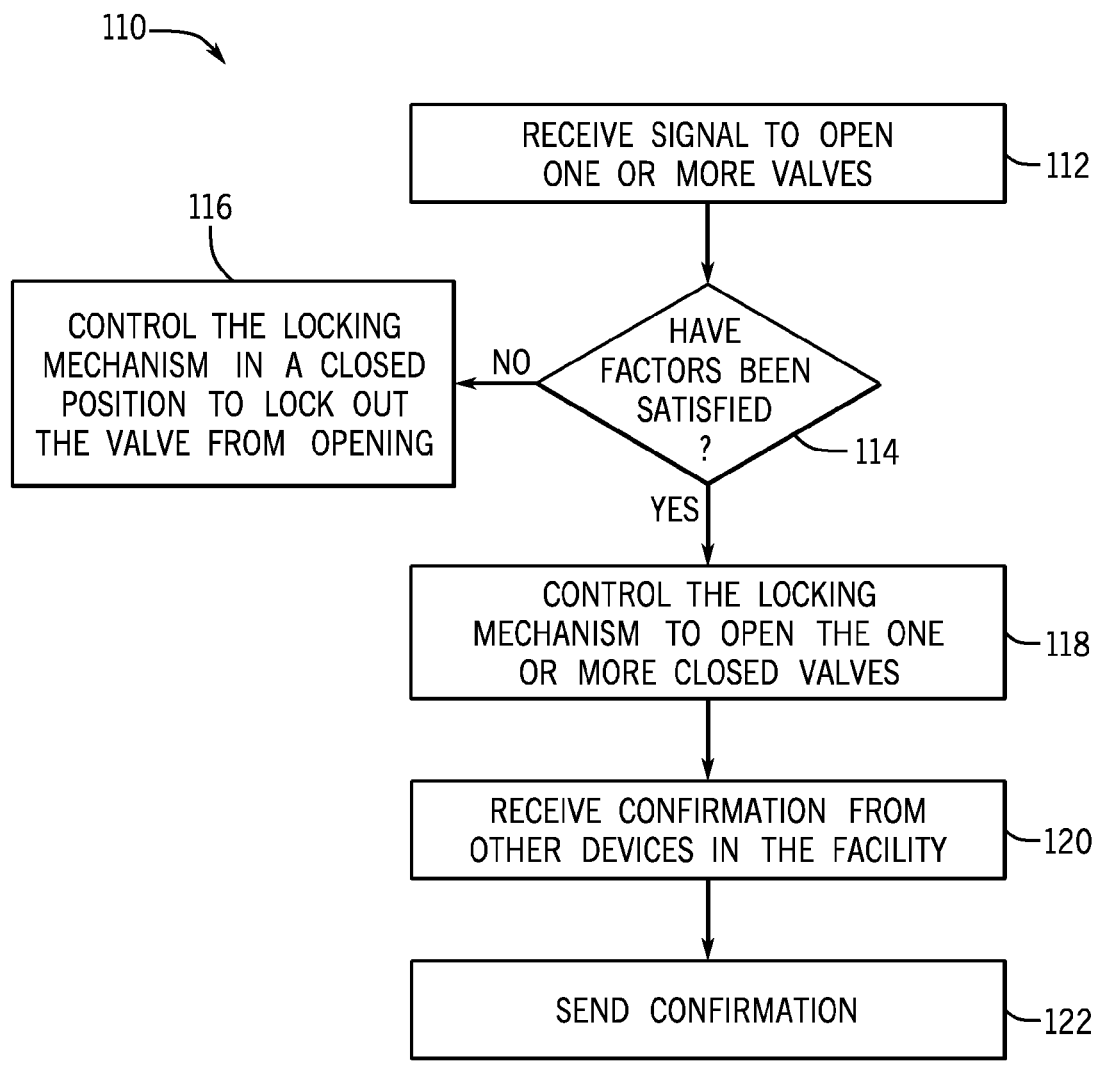
FIG. 10 is a flow diagram of a method for opening the valves of the manifold apparatus of FIG. 5, in accordance with embodiments presented herein.

FIG. 10 is a flow diagram of a method 110 for actuating (e.g., opening) the valves 54 of the manifold apparatus 23 of FIG. 5, in accordance with embodiments presented herein. Although the following description of the method 110 is described with reference to the processor 60 of the manifold apparatus 23, it should be noted that the method 110 may be performed by one or more other processors disposed on other devices that may be capable of communicating with the manifold apparatus 23, such as the computing device 26, the cloud-based computing system 28, the control/monitoring device 14, or other components associated with the industrial application 24. Additionally, although the following method 110 describes a number of operations that may be performed, it should be noted that the method 110 may be performed in a variety of suitable orders and all of the operations may not be performed. It should be appreciated that the method 110 may be wholly executed by the manifold apparatus 23 or the execution may be distributed between the computing device 26 and/or the cloud-based computing system 28.

Referring now to the method 110, the processor 60 may receive (block 112) a signal to open one or more valves 54 (e.g., supply the liquid or gas source). The signal may be sent from software executing on the computing device 26, the control/monitoring device 14, the cloud-based computing system 28, or the like. In some embodiments, the signal may be sent as input from the technician interacting with the display 68 to supply a liquid or gas source to industrial automation equipment 16 connected to the feeder lines 25 providing the liquid or gas source (e.g., air, gas, nitrogen).

The processor 60 may determine (block 114) whether certain factors have been satisfied prior to opening the one or more valves 54. For example, in some embodiments, the processor 60 may not open any valves 54 unless the processor 60 receives signals indicating that proper personal protection equipment (PPE) is worn by the technician near the manifold apparatus 23. The PPE to be worn by the technician may include a mask, gloves, goggles, a helmet, boots, jacket, identification badge (e.g., includes name, age, health related information, blood type, allergies), and so forth. Other factors may include whether downstream equipment 16 are offline, whether upstream equipment 16 are offline, whether an authorization code has been received, whether the technician has been authorized, whether a notification that the valves 54 will open has been sent to interested parties and/or other connected equipment 16, and the like. When the factors have not been satisfied, the processor 60 may control (block 116) the locking mechanism 66 by sending control signals to the locking mechanism 66 to maintain a closed position to lock out the one or more valves 54 from opening.

In contrast, when the factors are satisfied, the processor 60 may control (block 118) the locking mechanism 66 by sending control signals to the locking mechanism 66 to open the one or more valves 54. Further, the processor 60 may receive (block 120) a confirmation (e.g., acknowledgment or negative acknowledgment) from other devices in the facility. For example, the industrial automation equipment 16 or the control/monitoring device 14 may send a confirmation to the manifold apparatus 23 when the industrial automation equipment 16 receives the liquid or gas source after the one or more valves 54 are opened. In some embodiments, the manifold apparatus 23 may send (block 122) the confirmation to the computing device 26, the cloud-based computing system 28, other industrial automation equipment 16, or the like. The software running on the computing device 26 that assists the technician in placing a machine offline may perform an action, such as move to the next step in the lockout-tagout procedure, based on the confirmation received.

Figure 11:
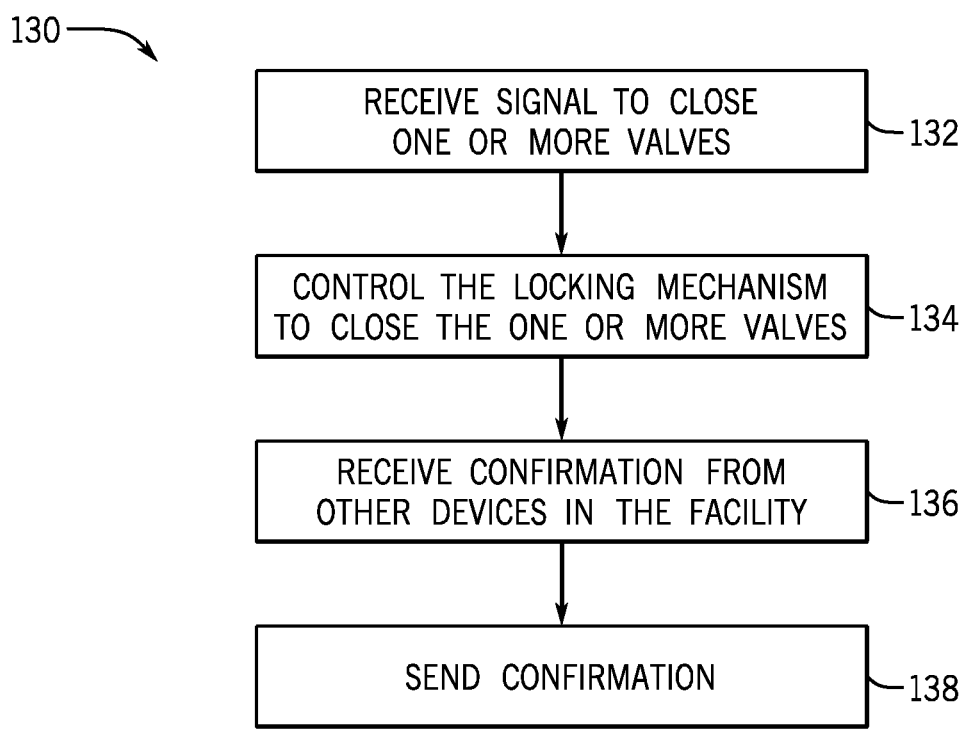
FIG. 11 is a flow diagram of a method for closing the valves of the manifold apparatus of FIG. 5, in accordance with embodiments presented herein.

FIG. 11 is a flow diagram of a method 130 for actuating (e.g., closing) the valves of the manifold apparatus 23 of FIG. 5, in accordance with embodiments presented herein. Although the following description of the method 130 is described with reference to the processor 60 of the manifold apparatus 23, it should be noted that the method 130 may be performed by one or more other processors disposed on other devices that may be capable of communicating with the manifold apparatus 23, such as the computing device 26, the cloud-based computing system 28, the control/monitoring device 14, or other components associated with the industrial application 24. Additionally, although the following method 130 describes a number of operations that may be performed, it should be noted that the method 130 may be performed in a variety of suitable orders and all of the operations may not be performed. It should be appreciated that the method 130 may be wholly executed by the manifold apparatus 23 or the execution may be distributed between the computing device 26 and/or the cloud-based computing system 28.

When a machine is being placed offline, one step in the lockout-tagout protocol may include bleeding off excess liquid or gas from a feeder line 25. For example, pressure from a pressure feeder line 25 received by the machine may be bled off during the lockout-tagout procedures. As such, software running on the computing device 26 that is used to assist a technician in placing the machine offline may send a signal to close one or more valves 54 to the communication component 64 of the manifold apparatus 23. The communication component 64 may send the signal to the processor 60, which may receive (block 132) the signal to close the one or more valves 54. In some embodiments, the signal may be sent from the control/monitoring device 14, the cloud-based computing system 28, or the like. In yet other embodiments, the signal may be sent as input from the technician interacting with the display 68 to close the valves 54, as desired (e.g., bleed off pressure to industrial automation equipment 16 connected to the feeder lines 25 providing the pressure).

The processor 60 may control (block 134) the locking mechanism 66 by sending control signals to the locking mechanism 66 to close the one or more opened valves 54. In some embodiments, the locking mechanism 66 may include one or more actuators that receive the control signal from the processor 60 and cause one or more gears to rotate, thereby closing or opening the switches 52 and/or valves 54. In some embodiments, the locking mechanism 66 may include armatures and contact bases and the armatures may be manually operated by a technician to close. When the armature closes on the base, a control signal may be sent to a respective switch 52 or valve 54 to close or open. Further, the processor 60 may receive (block 136) a confirmation (e.g., acknowledgment or negative acknowledgment) from other devices in the facility. For example, the industrial automation equipment 16 attached to the pressure feeder line 25 may send a confirmation that the liquid or gas source has been successfully bled off. In some embodiments, the manifold apparatus 23 may send (block 138) the confirmation to the computing device 26, the cloud-based computing system 28, other industrial automation equipment 16, the control/monitoring device 14, or the like. The software running on the computing device 26 that assists the technician in placing a machine offline may perform an action, such as move onto the next step in the lockout-tagout procedure, based on the confirmation sent by the manifold apparatus 23.

Figure 12:
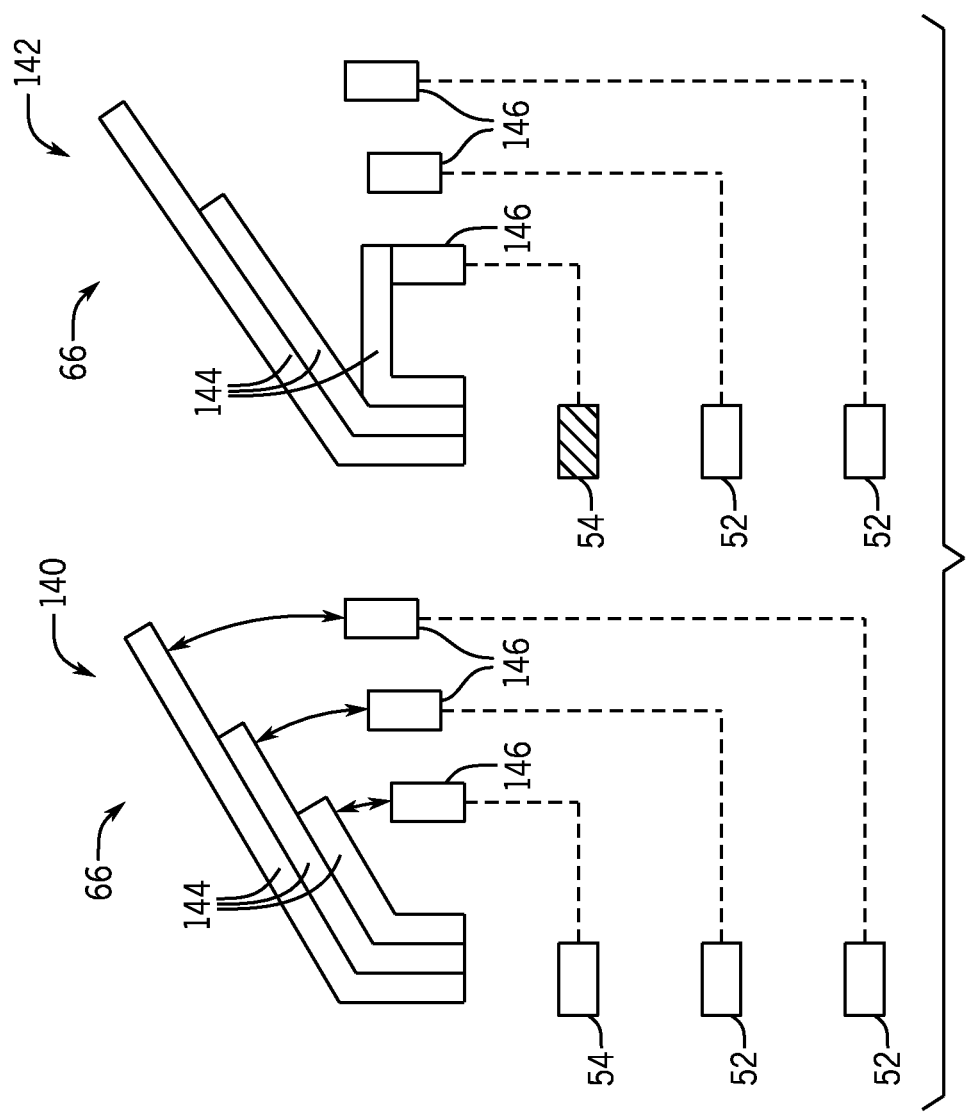
FIG. 12 is a schematic diagram of an example locking mechanism used in the manifold apparatus of FIG. 5, in accordance with embodiments presented herein.

FIG. 12 is a schematic diagram of an example locking mechanism 66 used by the manifold apparatus 23 of FIG. 5, in accordance with embodiments presented herein. In some embodiments, the locking mechanism 66 may be disposed on the outside of the manifold apparatus 23. As illustrated, the locking mechanism 66 is in an opened position 140 and a partially closed position 142. In some embodiments, the locking mechanism may include one or more armatures 144 that may contact with a respective base 146. It should be noted that although three armatures 144 and three bases 146 are depicted in the example locking mechanism 66, any suitable number may be used in proportion to the number of feeder lines 25 passing through the manifold apparatus 23. The locking mechanism 66 may be integrated with each valve 54 and switch 52 included in the manifold apparatus 23 to control the actuation (e.g., opening and closing) of the valves 54 and switches 52. As depicted, a first base is electrically coupled to a valve 54 that may supply gas to the industrial automation equipment 16, a second base is electrically coupled to a switch 52 that may supply electricity to the industrial automation equipment 16, and a third base is electrically coupled to another switch 52 that may supply a different amount of electricity to the industrial automation equipment 16. A technician may close (e.g., contact the respective base 146) the appropriate armature 144 to send a signal to the switch 52 to close (e.g., provide electricity) or to the valve 54 to open (e.g., provide air, fuel, or the like). Likewise, the technician may open (e.g., disconnect from the respective base 146) the appropriate armature 144 to send a signal to the switch to open (e.g., disconnect electricity supply) or to the valve 54 to close (e.g., disconnect air or fuel supply).

As should be appreciated, the locking mechanism 66 may provide a single locking mechanism 66 for multiple types of feeder lines 25 (e.g., air, fuel, electric) by closing as a uniform unit. Additionally, the locking mechanism 66 may provide for partial lockout of feeder lines 25, as shown in the partially closed position 142 where only one armature 144 is closed and the other two armatures 144 remain open. Such embodiments may lead to various combinations of feeder lines 25 being closed or open based on whether the respective armature is closed (e.g., contacting its respective base 146). In the depicted embodiment, the valve 54 is shown as highlighted, which represents that the valve 54 is open and supplying a material to the industrial automation equipment 16, while the switches 52 are not highlighted because their respective armatures 144 are not contacting the bases 146.

In some embodiments, the armatures 144 may be arranged and connected to switches and valves 54 in a certain order according to steps for placing industrial automation equipment 16 offline. As depicted, the armatures 144 may have varying lengths and be arranged in vertical alignment with one another. Thus, if an armature 144 is shorter than another armature 144, opening the shorter armature 144 may not be completed without also opening the longer armature(s) 144. That is, the shorter armatures 144 may not be opened without also opening the longer armatures 144. Using such a locking mechanism 66 may be particularly beneficial for protocols (e.g., lockout tagout)

that specify certain valves 54 and/or switches 52 are closed and/or opened in a particular order when placing industrial automation equipment 16 offline. For example, during operation, a gas pump may use a gas supply provided by an open valve 54 and electricity provided by a closed switch 52. Certain protocols may specify that the gas supply is to be shut off before or at substantially the same time as the electricity being removed. Thus, a longer armature 144 may be connected to the valve 54 that supplies the gas to the gas pump and a shorter armature 144 may be connected to the switch 52 that supplies the electricity. Thus, the shorter armature 144 may not be opened (e.g., opening the switch 52 to disconnect electricity) without also opening the longer armature 144 (e.g., closing valve 54 to shut off gas supply). However, the longer armature 144 may be opened (e.g., closing valve 54 to shut off gas supply) without opening the shorter armature 144 (e.g., opening the switch 52 to disconnect electricity).

As may be appreciated, the same may be true for closing the armatures when placing the industrial automation equipment 16 online. That is, if an armature 144 is longer than another armature 144, closing the longer armature 144 may not be completed without also closing the shorter armature(s) 144. That is, the longer armatures 144 may not be closed without also closing the longer armatures 144. Using such a locking mechanism 166 may be particularly beneficial for protocols that specify certain valves 54 and/or switches 52 are closed and/or opened in a particular order when placing industrial automation equipment 16 in service.

Figure 13:
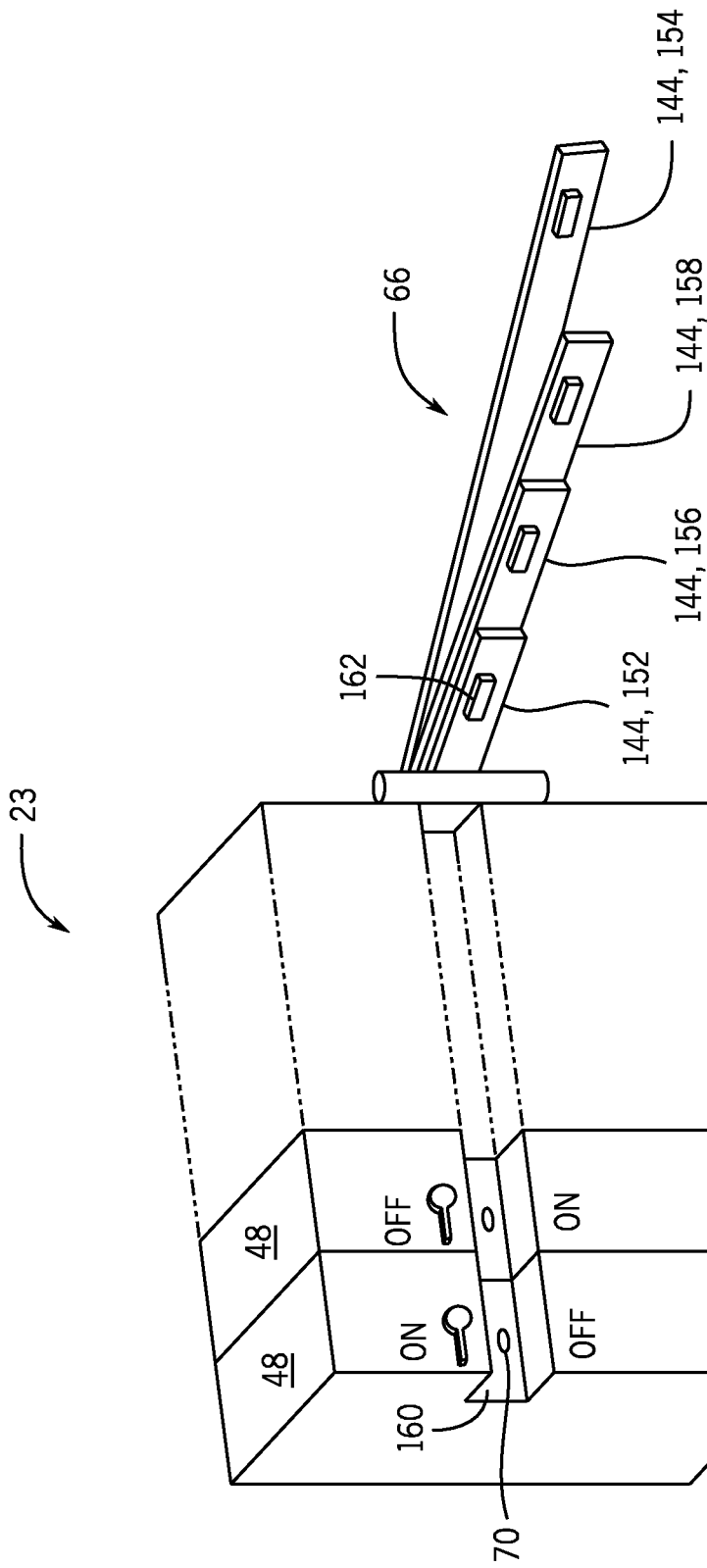
FIG. 13 is a schematic diagram of the manifold apparatus of FIG. 5 including an attached example locking mechanism, in accordance with embodiments presented herein.

FIG. 13 is a schematic diagram of the manifold apparatus 23 of FIG. 5 including an attached example locking mechanism 66, in accordance with embodiments presented herein. As depicted, the locking mechanism 66 may be attached to a side of the manifold apparatus 23. Each armature 144 of the locking mechanism 66 may be arranged in order based on size (e.g., from shortest to longest or from longest to shortest). In the depicted embodiment, the armatures 144 are arranged in order from a shortest armature 152 in front and a longest armature 154 in back. The shortest armature 152 may be arranged first in the order because it may close and open a valve 54 or electrical switch 52 in the housing 48 nearest to the locking mechanism 66. The longest armature 154 may be arranged last in the order because it may close and open a valve 54 or switch 52 in the housing 48 furthest from the locking mechanism 66. Mid-length armatures 156 and 158 may be arranged in between the shortest armature 152 and the longest armature 154.

In the depicted embodiment, a technician may manually actuate the armatures 144 one at a time or may manually actuate numerous armatures 144, a subset of the armatures 144, at once. For example, when the technician manually actuates (e.g., closes) an armature 144 that is longer than other armature(s) 144, the other armature(s) 144 may be forced closed as well. To illustrate, closing the longest armature 154 may cause the shorter armatures 152, 156, and 158 to close as well. When an armature 144 is closed, the respective valve 54 or electrical switch 52 may be physically prevented from changing states. For example, the armature 144 may be actuated into recess 160 of one or more housings 48 and physically prevent the associated electrical switch 52 associated with the housing 48 from changing states (e.g., closing). In another example, the armature 144 may be actuated into recess 160 of one or more housings 48 and physically prevent the associated valve 54 from changing states (e.g., opening). The armatures 144 may be nested with respect to one another and include curved shapes that provide a consistent block to any switching mechanisms that would be capable of actuation without the armatures 144 in place. In some embodiments, the armatures 144 may include an opening 162 that enables the light indicator 70 of the housing 48 to be visible when the armature 144 is in the closed position. In some embodiments, the armatures 144 may be actuated via the actuators 74 of the manifold apparatus 23. The processor 60 may receive a command signal to close one or more of the armatures 144 as part of a certain process (e.g., lockout-tagout) and send a signal to the actuators 74 associated with the one or more armatures 144 to actuate the armatures 144 closed.

In certain embodiments, actuating any respective armature 144 may cause a respective electrical switch 52 or valve 54 to change states once the respective armature 144 is positioned within the recess 160 of the respective housing 48 of the respective electrical switch 52 or valve 54. In one example, if the armature 154 is closed, thereby closing the armatures 152, 156, and 158, the respective electrical switches 52 or valves 54 of the respective housings may systematically change states. That is, a computing device 26 associated with the manifold apparatus 23 may begin shut off or procedures to change states of the respective electrical switches 52 or valves 54 of the manifold apparatus 23. In one embodiment, the armatures 144 may be arranged such that a logical order in which the respective electrical switches 52 or valves 54 should change states is achieved by closing the armature 152, the armature 156, the armature 158, and the armature 154 in order. In other words, the armatures 144 may be arranged such that the components of the respective housing 48 associated with the armature 152 should change states (e.g., valve that supplies a gas becomes open) before the components of the respective housing 48 associated with the armature 156 should change states (e.g., air pump activates).

It should be noted, that the manifold apparatus 23 may be modular. That is, additional housings 48 may be attached to the manifold apparatus 23 if it is desirable to add another electrical switch 52 and/or valve 54. To that end, the locking mechanism 66 may be modular, as well. Depending on where the one or more additional housings 48 are attached on the manifold apparatus 23, additional respective armatures 144 may be attached to the locking mechanism 66. For example, if the housing 48 is attached to an end of the manifold apparatus 23 farthest from the locking mechanism 66, then a new longest armature 144 may be attached and arranged in the back of the order of the armatures 144. It may be appreciated that such a feature enables customizability to include and remove housings 48 and/or armatures 144 as desired.

It should be noted that the methods 80, 100, 110, and 130 are performed using the processor 60 that is part of the manifold apparatus 23. It should be understood that the methods 80, 100, 110, and 130 may be performed in combination at substantially the same time so that the opening and closings of the feeder lines 25 via the respective valves 54 and/or 52 may be controlled as desired throughout the lockout-tagout procedures. The manifold apparatus 23 and the computing device 26 are configured to execute instructions that enable each device to interact with the industrial automation equipment 16. As such, the manifold apparatus 23 and the computing device 26 are tied to particular machines to assist in the management and operations of the industrial automation equipment 16, and thus, the industrial application 24. Moreover, it should be noted that the data received by the manifold apparatus 23, the computing device 26, the cloud-based computing system 28, the industrial automation equipment 16, or the control/ monitoring device 14 may be transformed when being transmitted, analyzed, or depicted for view by a user of the respective device. For example, the signals generated to control the actuation of the electrical switches 52 and/or valves 54 to supply a source (e.g., electricity, liquid, or gas) to the industrial automation equipment 16 may include transformation of received signals, data obtained via sensors 72 (e.g., indicating whether proper PPE is worn), or the like to the control signals used to control the locking mechanism 66.

Technical effects of the embodiments described herein include providing a manifold apparatus 23 that receives a number of different types of feeder lines 25 and uses the single locking mechanism 66 to control the opening and closing of the feeder lines 25 via respective switches 52 and/or valves 54. As previously discussed, the locking mechanism 66 may provide for various degrees of facility lockout or shutdown procedures (e.g., preventing power from entering a facility but allowing pressure to be available). Also, the manifold apparatus 23 may enable coordinating the operation of the manifold 23 with software running on the computing device 26 used to assist the technician in placing machines offline. The coordinated efforts between the software running on the computing device 26 and the manifold apparatus 23 may help ensure that machines are placed offline properly.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A manifold apparatus, comprising:
   a plurality of housings, wherein each of the housings is configured to receive an electrical or a fluid conduit;
   a plurality of actuation mechanisms, a respective one of the actuation mechanisms of each of the plurality of housings configured to control a supply of electricity or fluid from the respective electrical or fluid conduit to one or more industrial automation equipment;
   a single locking mechanism associated with the plurality of housings, the single locking mechanism comprising a plurality of armatures, wherein each of the plurality of armatures is associated with a respective housing of the plurality of housings, and wherein each of the plurality of armatures is configured to physically prevent the respective one of the actuation mechanisms of the respective housing from changing states.

2. The manifold apparatus of claim 1, comprising a processor configured to control an operation of the actuation mechanism, which comprises an electrical switch or a valve.

3. The manifold apparatus of claim 2, wherein the processor is configured to receive a signal to open or close the electrical switch of each of the plurality of housings, open or close the valve of each of the plurality of housings, or both based on a plurality of positions of the plurality of armatures.

4. The manifold apparatus of claim 3, comprising a computing device configured to provide the signal, wherein the computing device is configured to assist in placing the one or more industrial automation equipment offline according to a lockout-tagout procedure and the one or more industrial automation equipment is coupled to the electrical or fluid conduit.

5. The manifold apparatus of claim 4, wherein the plurality of armatures is configured to be manually actuated.

6. The manifold apparatus of claim 2, wherein a size of each of the plurality of armatures depends on an arrangement of the plurality of armatures relative to the plurality of housings.

7. The manifold apparatus of claim 2, wherein the processor is configured to determine whether proper personal protective equipment is present before opening or closing the actuation mechanism.

8. The manifold apparatus of claim 1, wherein the processor is configured to receive a confirmation from the one or more industrial automation equipment connected to the actuation mechanism is opened or closed.

9. The manifold apparatus of claim 8, wherein the processor is configured to send the confirmation to a computing device, wherein the confirmation causes the computing device to place the one or more industrial automation equipment offline.

10. The manifold apparatus of claim 1, wherein each of the plurality of housings comprises a light indicator configured to indicate a status of the electrical switch or the valve.

11. The manifold apparatus of claim 10, wherein each of the plurality of armatures comprises an opening such that the light indicator is visible when the plurality of armatures is closed.

12. An industrial automation system, comprising:
    one or more industrial automation equipment;
    a manifold apparatus comprising:
      a plurality of housings, wherein each of the housings receives at least one of an electrical line or a fluid source, wherein each of the plurality of housings comprise at least one of:
        an electrical switch configured to connect and disconnect the electrical line to the one or more industrial automation equipment, or
        a valve configured to connect and disconnect the fluid source to the one or more industrial automation equipment;
      a single locking mechanism associated with the plurality of housings and attached to the manifold apparatus, wherein the single locking mechanism comprises a plurality of armatures that are each configured to physically prevent at least one of the electrical switch or the valve of a respective one of the plurality of housings from changing states, wherein each of the plurality of armatures is associated with the respective one of the plurality of housings; and
      a processor configured to control an operation of each of at least one of the electrical switch or the valve.

13. The system of claim 12, wherein the fluid source comprises a conduit for nitrogen, fuel, air, water, or some combination thereof.

14. The system of claim 12, wherein the plurality of armatures are arranged adjacently to one another in order by size, wherein an armature in the back of the order is a longest and configured to actuate any preceding shorter armatures when actuated.

15. The manifold apparatus of claim 14, wherein the processor is configured to determine whether proper personal protective equipment is present before opening or closing the electrical switch of each of the plurality of housings, the valve of each of the plurality of housings, or both.

16. The manifold apparatus of claim 14, wherein each of the plurality of armatures comprises an opening such that a light indicator of each of the plurality of housings is visible when the plurality of armatures is closed.

17. The manifold apparatus of claim 12, wherein the processor is configured to coordinate the opening and closing of the electrical switch and the valve of the plurality of housings with a computing device, wherein the computing device is configured to assist in placing the one or more of industrial automation equipment offline.

18. A method, comprising:
   receiving, by a processor, one or more signals configured to:
      connect or disconnect a plurality of electrical lines via a respective plurality of electrical switches included in a plurality of housings of a manifold apparatus;
      connect or disconnect a plurality of liquid or gas sources via a respective plurality of valves included in the plurality of housings, wherein the manifold apparatus is configured to operate in an industrial environment and the plurality of electrical lines and the plurality of liquid or gas sources are coupled to a machine in the industrial environment; and
   controlling, via the processor, a single locking mechanism attached to the manifold apparatus and associated with the plurality of housings, wherein the single locking mechanism comprises a plurality of armatures configured to physically prevent a respective one of the respective plurality of electrical switches or a respective one of the respective plurality of valves of a respective one of the plurality of housing from changing states, wherein each of the plurality of armatures is associated with the respective one of the plurality of housing of the plurality of housings.

19. The method of claim 18, wherein the one or more signals are received from an input interface of the manifold apparatus, a computing device, a cloud-based computing system, or some combination thereof to facilitate placing the machine offline.

20. The method of claim 18, comprising receiving, via the processor, a confirmation that the plurality of electrical lines connect or disconnect successfully, the plurality of liquid or gas sources connect or disconnect successfully, or some combination thereof.

21. The method of claim 18, comprising: receiving, by the processor, the one or more signals to connect or disconnect the plurality of electrical lines via the respective plurality of electrical switches of the plurality of housings included in the manifold apparatus, to connect or disconnect the plurality of liquid or gas sources via the respective plurality of valves of the plurality of housings, or both to the machine in the industrial environment;
   determining, via the processor, whether personal protective equipment (PPE) is present; and controlling, via the processor, the plurality of armatures of the locking mechanism to operate the plurality of electrical switches and the plurality of valves of the plurality of housings based on the signals when PPE is being used.

* * * * *